J. REID, Jr.
MOWER.
APPLICATION FILED MAY 8, 1915.
1,185,243.
Patented May 30, 1916.
2 SHEETS—SHEET 1.
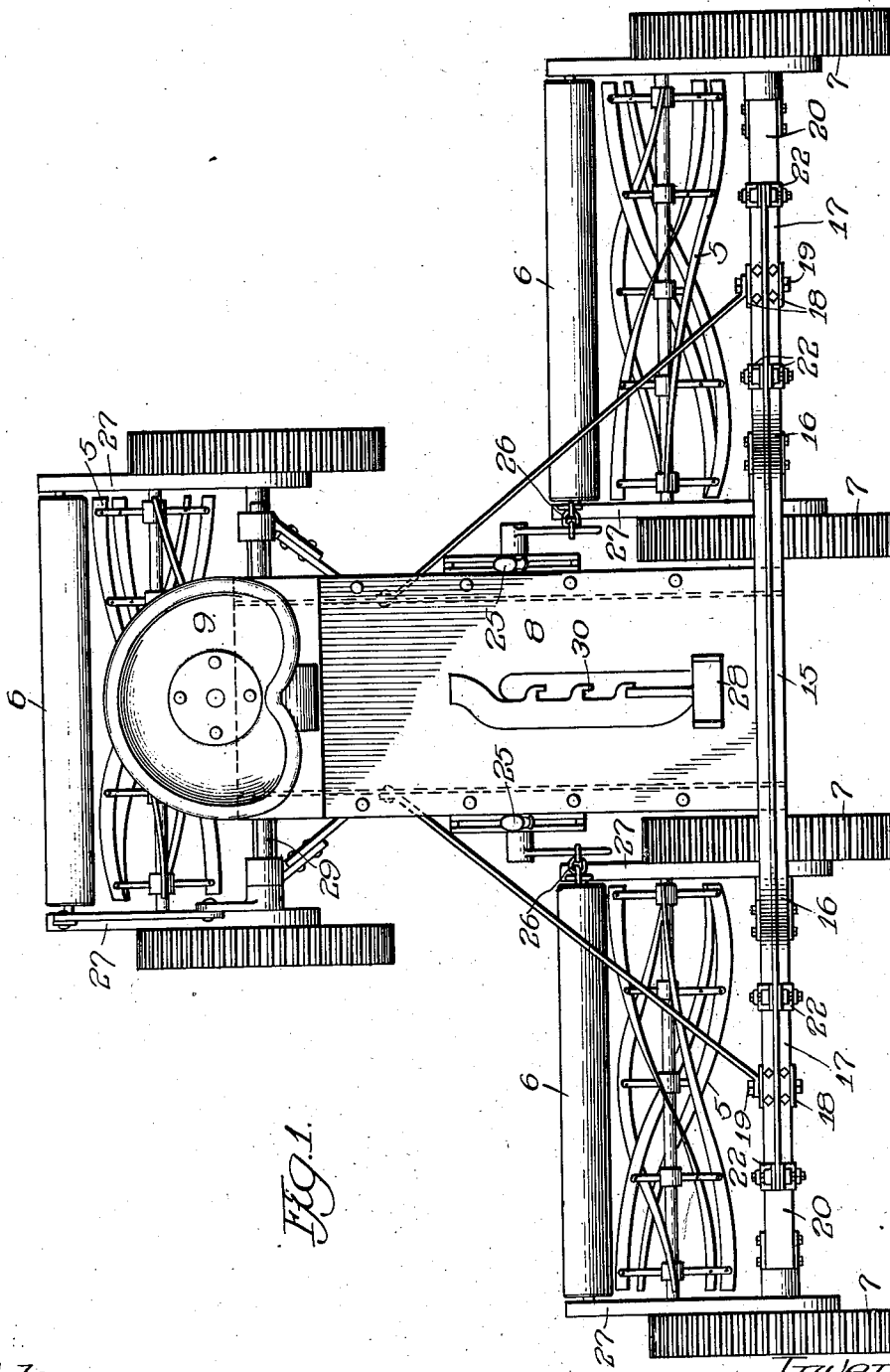

J. REID, Jr.
MOWER.
APPLICATION FILED MAY 8, 1915.
1,185,243.
Patented May 30, 1916.
2 SHEETS—SHEET 2.
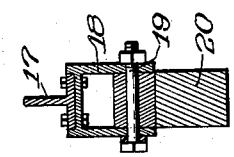
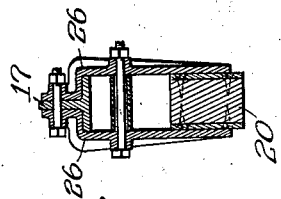
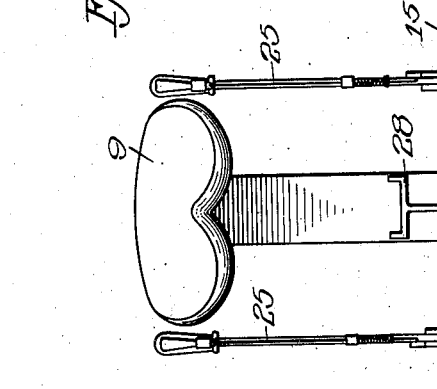
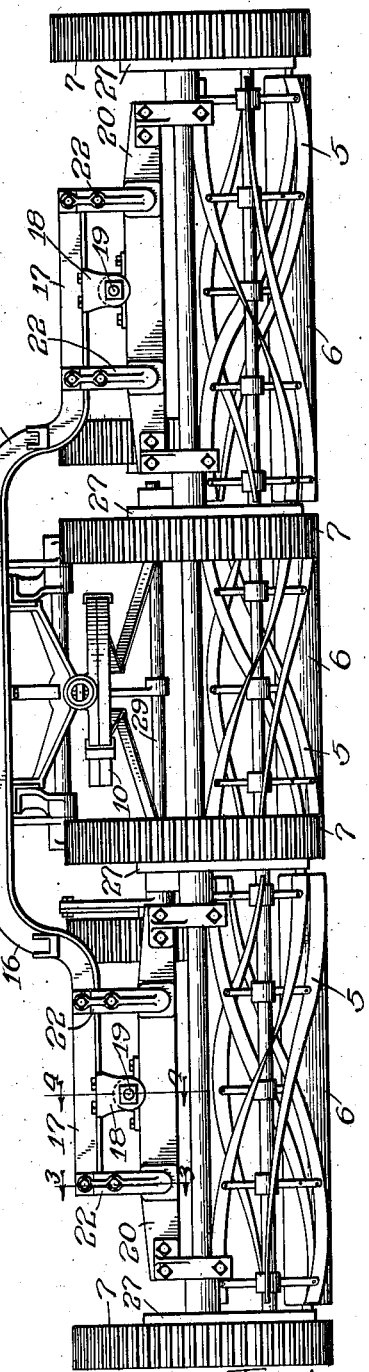
Witnesses:
Inventor:
John Reid, Jr.
By James A. Walsh
Atty.

UNITED STATES PATENT OFFICE.

JOHN REID, JR., OF RACINE, WISCONSIN, ASSIGNOR TO BELLE CITY MANUFACTURING COMPANY, OF RACINE, WISCONSIN, A CORPORATION.

MOWER.

1,185,243.  Specification of Letters Patent.  Patented May 30, 1916.

Application filed May 8, 1915. Serial No. 26,674.

*To all whom it may concern:*

Be it known that I, JOHN REID, Jr., a citizen of the United States, residing at Racine, in the county of Racine and State of Wisconsin, have invented certain new and useful Improvements in Mowers, of which the following is a specification.

My invention relates to improvements in mowers of that class designed especially to be operated upon pleasure grounds, such as golf links and the like, which comprises a plurality of rotary cutters and land rollers so disposed as to cut a wide swath in its line of travel.

In performing work of this character it is essential that the grass be cut without rutting or otherwise disturbing the earth surface, and my object is to provide a mower the cutting elements of which will be yieldingly mounted in a simple manner so as to automatically conform to the irregularities of the soil and which when shifted from normal position by such irregularities will be capable of a wide range of vertical movement, and also to provide a supporting beam forming a part of the framework under which the draft wheels may freely turn when changing the direction of the machine, without interfering or contacting with the frame or other parts of the machine, which latter objection exists in some machines, causing the wheels to bind and skid or drag in a manner to rut and injure the soil.

It will also be understood that during the operation of mowing it becomes necessary to quickly lift one or more of the cutters from contact with the earth according to rough or other soil conditions, and a further object of my invention is to provide levers for each such element which will be under instant control of the operator and so arranged as to avoid mistakes in not lifting the proper cutter in cases of emergency, which is a common occurrence where such controlling members are closely grouped, resulting in confusion and mistake in grasping the proper lever when a certain cutter is to be elevated, all as will hereinafter more fully appear.

In the accompanying drawings which form a part hereof, Figure 1 is a plan of a mower embodying my improvements, Fig. 2 a front elevation thereof, and Figs. 3 and 4 detail sectional views on the dotted lines 3—3 and 4—4 in Fig. 2, as indicated by the arrows.

In general arrangement my improved mower is of a well known type comprising a plurality of cutters, 5, and rollers, 6, supported in a framework carried by wheels, 7, a platform, 8, and seat, 9, being provided for the operator, and a turntable, 10, of any approved form for permitting the draft wheels to turn as usual, all as will be readily understood. At the forward end of and forming a part of the frame work I arrange a horizontally arranged beam, 15, preferably comprising an inverted T-shaped iron bar which is curved or directed downwardly at its opposite ends, as at 16, and terminates in horizontal supporting members, 17. As each of said supporting members and the parts associated therewith are in duplicate, one only will be specifically described herein. Secured to said supporting member 17 is a hanger, 18, bolted to the flanges of said member 17, as indicated in Fig. 4, in which is pivotally mounted by means of bolt, 19, an equalizing bar, 20, which supports a mower, 5, said bar 20 being held from lateral displacement by suitable guides, 22, bolted to said member 17, Fig. 3, and which straddle said equalizing bar in a manner to permit the same to swing vertically, and thus as said mowers 5 together with their associated rollers 6 pass over an irregularity in the earth surface the same will become automatically adjusted to conform to such conditions. By this arrangement I provide a substantial and compact bearing and guide for the mower equalizer and one which will permit a wide vertical movement thereof, and by which the mower is maintained in correct cutting position; and it will also be understood that as said beam 15 is curved and elevated as plainly shown in Fig. 2, the draft wheels under all conditions have a free clearance and will not in any way contact with or bind against said beam but will continue to revolve and not skid in a manner to injure the soil. The rollers 6 associated with each of the cutters 5 act as weights therefor to hold the same close to the soil so that as a roller follows soil irregularities the cutters become accordingly adjusted and the distance between the cutting bars thereof and the soil is thus controlled. Therefore, by arranging the T-shaped beam as shown and described, I obtain a low line of draft for the machine which insures that said rollers and cutters will be maintained in close and steady contact with the soil without tendency of jumping, with the result that a uniform cutting of the grass is obtained.

In the operation of my improved mower it will be understood that when rough or undue irregularities of the soil are met, it becomes necessary to quickly elevate one or more of the cutting elements about to pass thereover, and this I accomplish by means of a lever, 25, disposed at opposite sides of platform 8 for each of the side cutters, which communicates through a chain, 26, with the frame, 27, bearing said cutter, which levers are positioned at opposite sides of the operator's seat, while in front of said seat is a treadle, 28, communicating with the rear cutter frame, 29, which treadle projects through platform 8, and the desired elevation of said rear cutter can be maintained by directing said treadle into the offset slot, 30, in said platform, as indicated in Fig. 1. By arranging said levers to be right and left hand and the rear cutter to be controlled by a treadle, it will be readily understood that the operator can instantly manipulate either in cases of emergency without making a mistake, which is common in mowers of this character, by reason of such levers being grouped together, resulting in serious injury to the soil.

I claim as my invention:

1. The combination, with a mowing machine, of a frame member comprising a beam bent near its ends to form offset depressed ends providing cutter supporting carriers, an equalizer support connected to each of said carriers, and an equalizer bar pivotally mounted on each of said supports for carrying a cutter.

2. In a mowing machine, frame members comprising a beam arranged transversely of said machine and bent near its ends to form offset depressed ends providing cutter supporting carriers.

3. In a mowing machine comprising a frame, draft-wheels and cutters, a beam mounted on said machine and bent near its ends to form offset depressed ends providing cutter supporting carriers, a pivotally mounted equalizing bar connected to each of said carriers, and a guide mounted on said carriers for controlling the movement of said bars.

4. The combination, with a mowing machine, of a T-shaped beam bent near its ends to form offset depressed ends providing cutter supporting carriers, a hanger mounted upon each of said carriers, a vertically swinging equalizer bar mounted in said hangers, and a cutter connected to each of said bars and movable therewith whereby said cutters may be adjusted to varying soil conditions.

5. The combination, with a mowing machine, of a beam comprising a single T-shaped bar bent near its ends to form offset depressed ends providing cutter supporting carriers, a hanger mounted upon each of said carriers, vertically swinging equalizing bars mounted in said hangers, and guides connected to said carriers and straddling said bars for restraining the lateral movement thereof.

In testimony whereof I affix my signature in presence of two witnesses.

JOHN REID, Jr.

Witnesses:
E. J. HERRINGTON,
J. A. WALSH.